T. W. McINTOSH & J. L. WILLIAMS.
HOOF SPREADER.
No. 181,091. Patented Aug. 15, 1876.
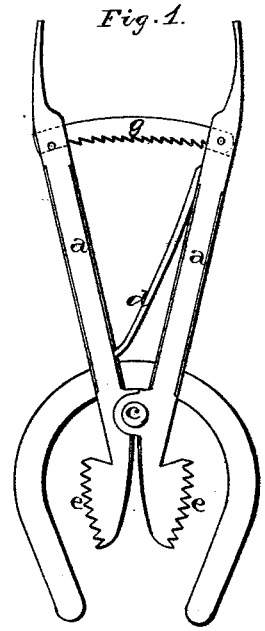
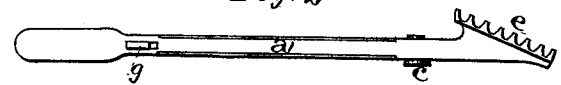
WITNESSES.
INVENTORS.

UNITED STATES PATENT OFFICE.

THEODORE W. McINTOSH AND JOHN L. WILLIAMS, OF BROWNSVILLE, INDIANA; SAID WILLIAMS ASSIGNOR TO WILKISON B. SPEER, OF SAME PLACE.

IMPROVEMENT IN HOOF-SPREADERS.

Specification forming part of Letters Patent No. 181,091, dated August 15, 1876; application filed January 2?, 1876.

*To all whom it may concern:*

Be it known that we, THEODORE W. McINTOSH and JOHN L. WILLIAMS, of Brownsville, in the county of Union, and State of Indiana, have invented certain new and useful Improvements in Hoof-Spreader; and we do hereby declare the following to be a full, clear, and exact description of the invention, such as will enable others skilled in the art to which it pertains to make and use it, reference being had to the accompanying drawings, which form part of this specification.

Our invention relates to an improvement in tools for spreading horses' hoofs; and it consists in the arrangement and combination of parts that will be more fully described hereinafter, whereby contracted hoofs can be spread apart while the shoe is being applied, and held until the shoe is nailed on.

The accompanying drawings represent my invention.

$a$ represents two levers of suitable length, that are pivoted together at $c$, and which are held apart by means of a spring, $d$. The shorter ends of the levers are flattened and spread out, as shown, and have the sharp, downwardly-pointed teeth $e$, formed in a curve around their outer edges, for catching in the under side of the horse's hoof. To the long end of the levers, close to where they are taken hold of by the hand, is attached a ratchet bar and catch, that will hold the two levers in any desired relation to each other. The shoe having been applied to the foot, the toothed ends of the levers are applied to the inside of the hoof, so as to catch hold against the sides, and then the long ends of the levers are pressed together, forcing the short ends apart, and thus opening out the rear ends of the hoof to any desired extent. After the hoof has thus been opened, the rack-bar $g$ holds it in that position until the last nail has been driven, when the shoe holds the hoof as it ought to be.

Having thus described our invention, we claim—

In a hoof-spreader, the combination of the two levers $a$, pivoted together at $c$, and having the teeth $e$ upon their shorter ends, with the ratchet-bar $g$ and spring $d$, substantially as shown and described.

In testimony that we claim the foregoing we have hereunto set our hands this 8th day of January, 1876.

THEODORE W. McINTOSH.
JOHN L. WILLIAMS.

Witnesses:
LON. H. PERRY,
M. C. CONNAWAY.